US008610223B2

(12) United States Patent
Lakamraju et al.

(10) Patent No.: US 8,610,223 B2
(45) Date of Patent: Dec. 17, 2013

(54) EMBEDDED MICROELECTROMECHANICAL SYSTEMS SENSOR AND RELATED DEVICES AND METHODS

(75) Inventors: Narendra V. Lakamraju, Tempe, AZ (US); Sameer M. Venugopal, Chandler, AZ (US); Stephen M. Phillips, Gilbert, AZ (US); David R. Allee, Phoenix, AZ (US)

(73) Assignee: Arizona Board of Regents, Scottsdale, AZ (US), a body corporate of the State of Arizona, Acting for and on behalf of Arizona State University ( * ) Notice: Subject to any disclaimer, the term of this patent is extended or adjusted under 35 U.S.C. 154(b) by 0 days.

(21) Appl. No.: 13/192,261

(22) Filed: Jul. 27, 2011

(65) Prior Publication Data

US 2012/0175714 A1 Jul. 12, 2012

Related U.S. Application Data

(63) Continuation of application No. PCT/US2009/068528, filed on Dec. 17, 2009.

(60) Provisional application No. 61/147,683, filed on Jan. 27, 2009, provisional application No. 61/174,438, filed on Apr. 30, 2009, provisional application No. 61/222,451, filed on Jul. 1, 2009.

(51) Int. Cl.
*H01L 27/20* (2006.01)
*H01L 21/02* (2006.01)

(52) U.S. Cl.
USPC ...... 257/415; 257/417; 257/88; 257/E27.006; 257/E21.002; 438/53; 438/24; 438/50; 438/51

(58) Field of Classification Search
USPC ............ 257/415, E27.006, E21.002, 88, 417, 257/419; 438/24, 53, 50, 51
See application file for complete search history.

(56) References Cited

U.S. PATENT DOCUMENTS

| 4,695,963 | A | * | 9/1987 | Sagisawa et al. ............. 700/258 |
| 5,983,727 | A | * | 11/1999 | Wellman et al. ................ 73/724 |
| 7,357,035 | B2 | * | 4/2008 | Liu et al. ......................... 73/756 |
| 2003/0043157 | A1 | | 3/2003 | Miles |
| 2004/0030258 | A1 | | 2/2004 | Williams et al. |
| 2004/0154400 | A1 | | 8/2004 | Johnson et al. |
| 2005/0121734 | A1 | | 6/2005 | Degertekin et al. |
| 2006/0067028 | A1 | * | 3/2006 | Floyd ............................ 361/278 |
| 2006/0067651 | A1 | * | 3/2006 | Chui ............................. 385/147 |
| 2007/0023851 | A1 | * | 2/2007 | Hartzell et al. ............... 257/414 |
| 2007/0099327 | A1 | | 5/2007 | Hartzell et al. |
| 2008/0112035 | A1 | | 5/2008 | Cummings |
| 2009/0103166 | A1 | | 4/2009 | Khazeni et al. |
| 2010/0028633 | A1 | | 2/2010 | O'Rourke |
| 2010/0079848 | A1 | | 4/2010 | Grasser et al. |

OTHER PUBLICATIONS

Zhou et al, "Flexible Substrate Micro-Crystalline Silicon and Gated Amorphous Silicon Strain Sensors," IEEE Transactions on Electron Devices, vol. 53, No. 2, Feb. 2006, pp. 380-385.

(Continued)

*Primary Examiner* — Thinh T Nguyen
(74) *Attorney, Agent, or Firm* — Bryan Cave LLP

(57) ABSTRACT

Embodiments of embedded MEMS sensors and related methods are described herein. Other embodiments and related methods are also disclosed herein.

23 Claims, 8 Drawing Sheets

(56) References Cited

OTHER PUBLICATIONS

Saias et al, "An Above IC MEMS RF Switch," IEEE Journal of Solid-State Circuits, vol. 38, No. 12, Dec. 2003, pp. 2318-2324.

Schuenemann et al., "MEMS Modular Packaging and Interfaces," 2000 Electronic Components and Technology Conference, 2000, pp. 681-688.

Palasagaram et al., "MEMS Capacitive Pressure Sensor Array Fabricated Using Printed Circuit Processing Techniques," Industrial Electronics Society, IECON 2005, 31st Annual Conference of IEEE, 2005 IEEE, pp. 2357-2362.

Wu et al., "Modeling of Simultaneous Ground Shock and Airblast Pressure on Nearby Structures from Surface Explosions," International Journal of Impact Engineering 31 (2005), pp. 699-717.

Tan et al., "Enhanced Analytical Model for Micromachined Microphones," International MEMS Conference 2006, Institute of Physics Publishing, Journal of Physics: Conference Series 34 (2006), pp. 847-852.

Jawed et al., "A Switched Capacitor Interface for a Capacitive Microphone," Research in Microelectronics and Electronics 2006, Ph. D, 2006 IEEE, pp. 385-388.

Ko et al, "Touch Mode Capacitive Pressure Sensors for Industrial Applications," Tenth Annual International Workshop on Micro Electro Mechanical Systems Proceedings, MEMS '97, 1997 IEEE, pp. 284-289.

O'Rourke et al., "Active Matrix Electrophoretic Displays on Temporary Bonded Stainless Steel Substrates With 180° C. a-Si:H TFTs," Society for Information Display, International Symposium Digest of Technical Papers, SID 08 Digest, pp. 422-424.

Arana et al., "Isotropic Etching of Silicon in Fluorine Gas for MEMS Micromachining," Institute of Physics Publishing, Journal of Micromechanics and Microengineering, J. Micromech. Microeng. 17 (2007), pp. 384-392.

Chan et al., "Gas Phase Pulse Etching of Silicon for MEMS With Xenon Difluoride," Proceedings of the 1999 IEEE Canadian Conference on Electrical and Computer Engineering, Shaw Conference Center Edmonton, Alberta, Canada, May 9-12, 1999, pp. 1637-1642, vol. 3.

Allee et al., "Threshold Voltage Instability in a-SI:H TFTs and the Implications for Flexible Displays and Circuits" In: Proceedings of the Army Science Conference (26th), Orlando, Florida, Dec. 1-4, 2008, pp. 1-8.

Patent Cooperation Treaty PCT International Search Report and Written Opinion of the International Searching Authority for International Application No. PCT/US09/68528, Sep. 1, 2010, 8 pages.

Patent Cooperation Treaty PCT International Search Report and Written Opinion of the International Searching Authority for International Application No. PCT/US09/68523, Sep. 1, 2010, 8 pages.

Lakamraju, N.V. et al. "MEMS shock sensor fabricated on flexible substrate," Flexible Electronics & Displays Conference and Exhibition, Feb. 2009, ISBN: 978-01-4244-4338-3.

Jain, K. et al. "Flexible Electronics and Displays: High-Resolution, Roll-to-Roll, Projection Lithography and Photoablation Processing Technologies for High-Throughput Production," Proceedings of the IEEE, Aug. 2005, vol. 93, Issue. 8, pp. 1500-1510, ISSN: 0018-9219.

Arias, A. C. et al. "Flexible Printed Sensor Tape to Diagnose Brain Injury," 11th International Conference on Advanced Materials, Rio de Janeiro, Brazil, Sep. 2009.

Jackson, N. et al. "Flexible Chip-Scale Package and Interconnect for Implant able MEMS Movable Microelectrodes for the Brain," Journal of Microelectromechanical systems, Apr. 2009, vol. 18, Issue 2, ISSN: 1057-7157.

Patent Cooperation Treaty PCT International Search Report and Written Opinion of the International Searching Authority for International Application No. PCT/US2010/055688, Sep. 15, 2011, 12 pages.

\* cited by examiner

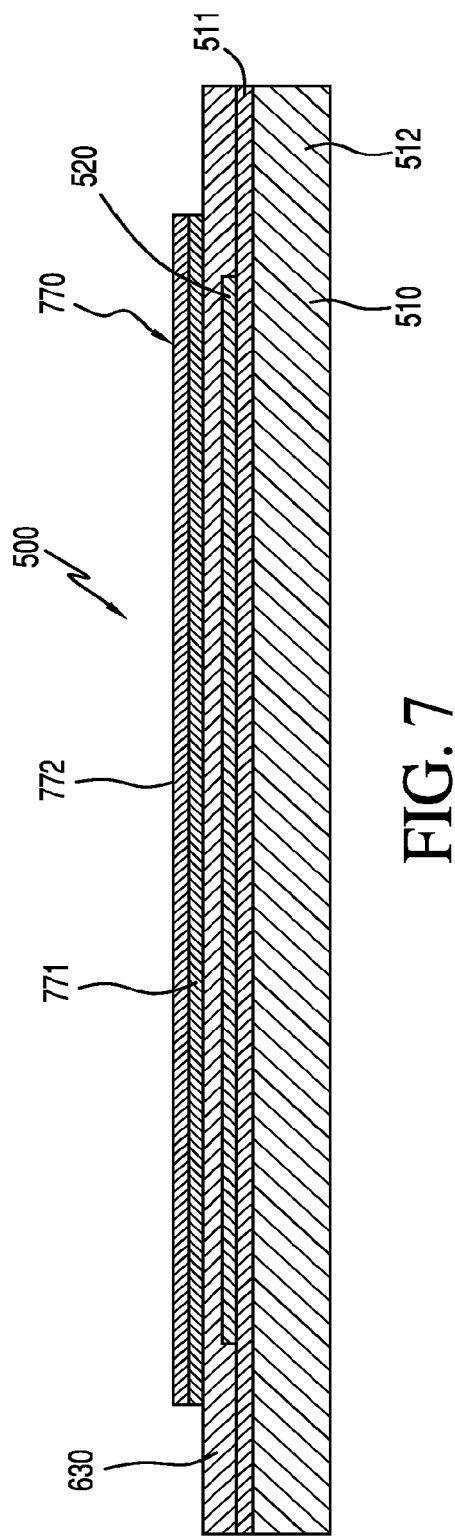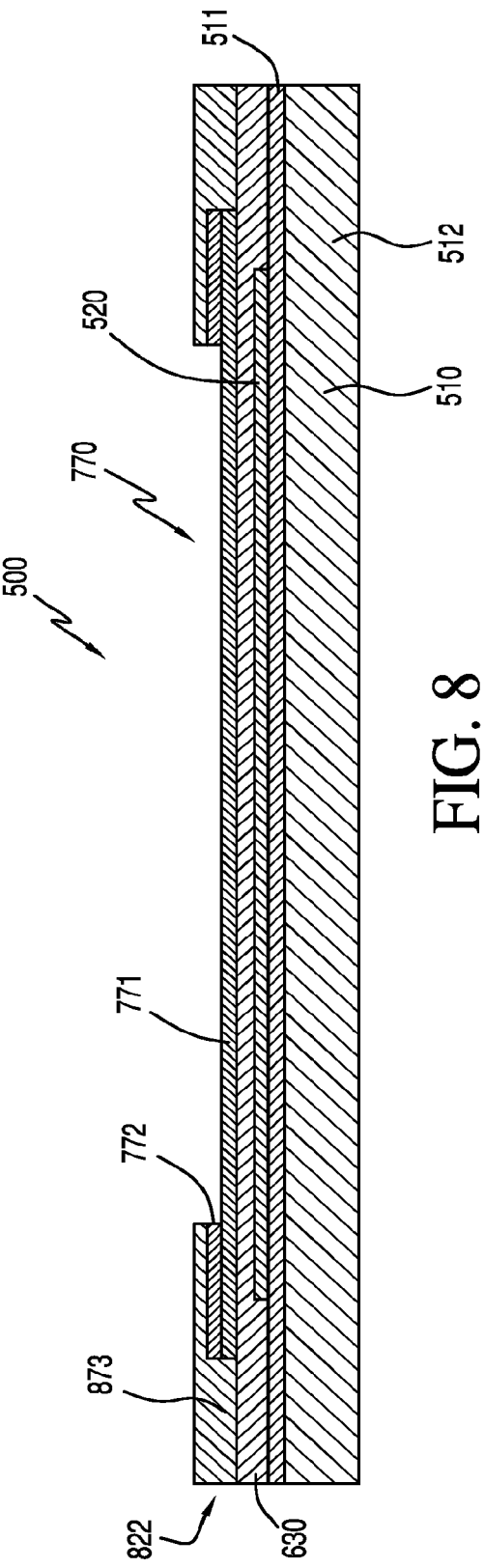

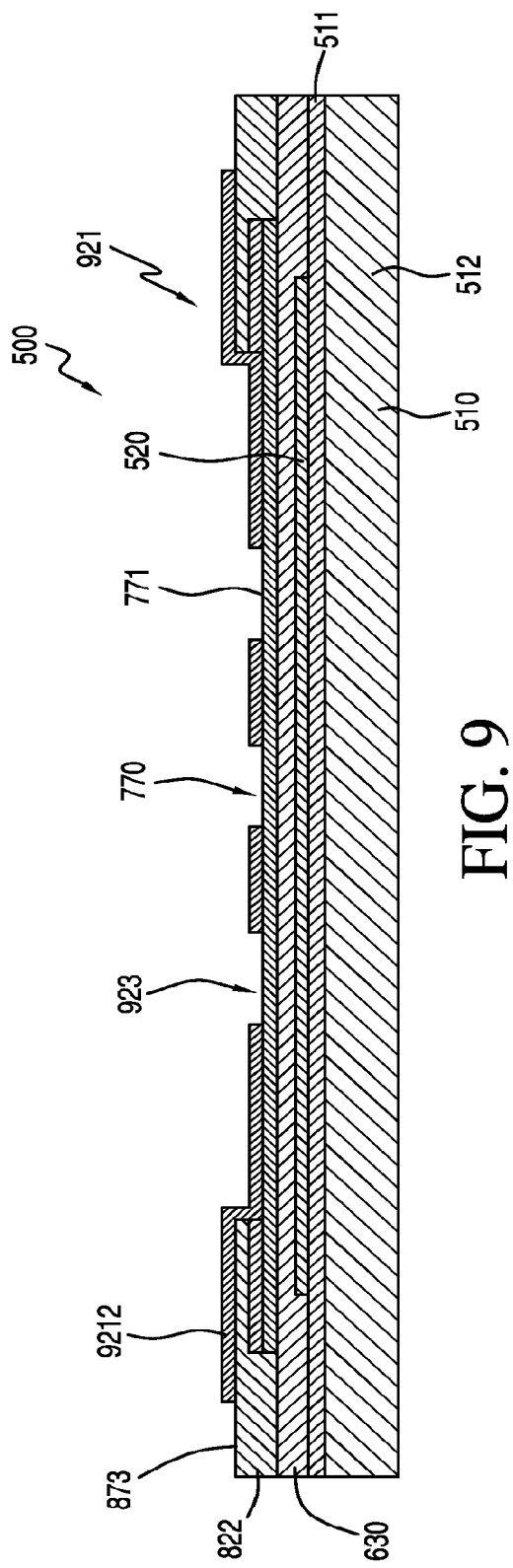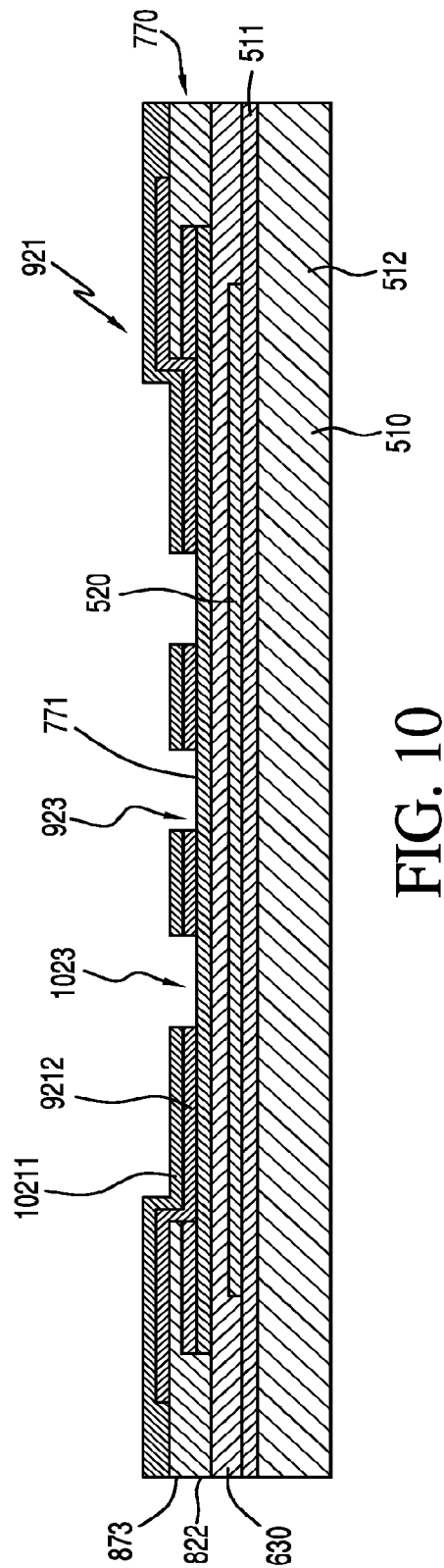

EMBEDDED MICROELECTROMECHANICAL SYSTEMS SENSOR AND RELATED DEVICES AND METHODS

CROSS-REFERENCE TO RELATED APPLICATIONS

This application is a continuation of PCT Application Ser. No. PCT/US2009/068528, filed Dec. 17, 2009, which claims the benefit of: (1) U.S. Provisional Application Ser. No. 61/147,683, filed on Jan. 27, 2009; (2) U.S. Provisional Application Ser. No. 61/174,438, filed on Apr. 30, 2009; and (3) U.S. Provisional Application Ser. No. 61/222,451, filed on Jul. 1, 2009. PCT Application Serial No. PCT/US2009/068528, U.S. Provisional Application Ser. No. 61/147,683, U.S. Provisional Application Ser. No. 61/174,438, and U.S. Provisional Application Ser. No. 61/222,451 are incorporated herein by reference.

STATEMENT REGARDING FEDERALLY SPONSORED RESEARCH OR DEVELOPMENT

At least part of the disclosure herein was funded with government support under grant/contract number W911NF-04-2-0005, awarded by the Army Research Laboratory (ARL). The United States Government may have certain rights in this application.

FIELD OF THE INVENTION

The disclosure herein relates generally to semiconductor devices and methods of providing semiconductor devices, and relates, more particularly, to semiconductor devices for displays with embedded MEMS (Micro Electro Mechanical System) sensors and related methods.

DESCRIPTION OF THE BACKGROUND

In the electronics industry, flexible substrates are quickly becoming popular as a base for electronic circuits. Flexible substrates can include a wide variety of materials including, for example, any of a myriad of plastics. Once a desired electronic component, circuit, or circuits are formed over a surface of the flexible substrate, the flexible substrate can be attached to a final product or incorporated into a further structure. As an example, recent developments have fabricated display matrices on flexible substrates.

MEMS (microelectromechanical system) devices have also gained in popularity in the electronics industry. Many types of MEMS devices have been developed for a myriad of applications, including MEMS sensors configured to measure pressure variations. Due to manufacturing constraints, however, the fabrication of MEMS devices has been relegated thus far to standard substrates such as silicon substrates. Integration of MEMS devices with displays and/or other devices fabricated on flexible substrates has thus been constrained.

Therefore, a need exists in the art to develop MEMS devices compatible with flexible substrates and methods to integrate the fabrication of such MEMS devices along with other devices on flexible substrates.

BRIEF DESCRIPTION OF THE DRAWINGS

To facilitate further description of the embodiments, the following drawings are provided in which:

FIG. 7 illustrates a cross-sectional view of a portion of the MEMS device of

FIG. 6 after a first part of the formation of a sacrificial structure;

FIG. 8 illustrates a cross-sectional view of a portion of the MEMS device of FIG. 7 after a second part of the formation of the sacrificial structure;

FIG. 9 illustrates a cross-sectional view of a portion of the MEMS device of FIG. 8 after a first part of the formation of a sensor membrane;

FIG. 10 illustrates a cross-sectional view of a portion of the MEMS device of FIG. 9 after a second part of the formation of the sensor membrane;

Figure 1:
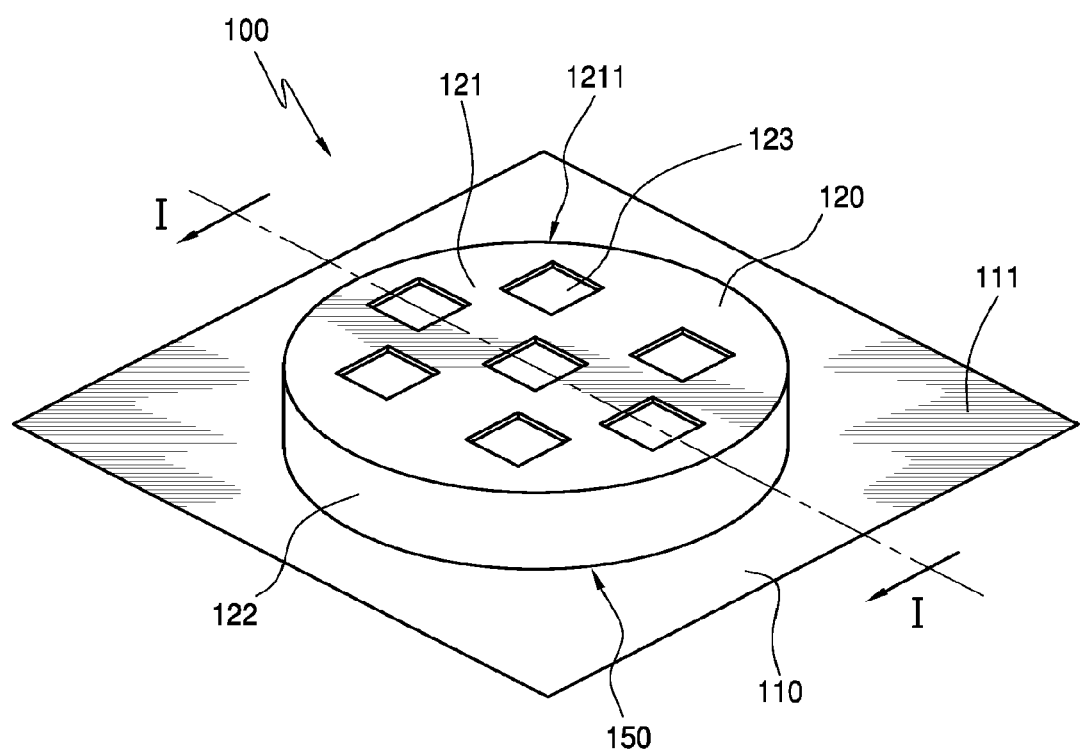
FIG. 1 illustrates a perspective view of a semiconductor device comprising a MEMS device according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

In one embodiment, a semiconductor device comprises a flexible substrate and a MEMS device fabricated over the flexible substrate. In the same or a different embodiment, the semiconductor device can comprise an electronic device fabricated over the substrate and electrically coupled to the MEMS device. In the same and other embodiments, the MEMS device can comprise an electrically conductive material located over the flexible substrate, a sensor membrane movably suspended over the electrically conductive material, and a first dielectric located over the electrically conductive material and under the sensor membrane.

In another embodiment, a method for providing a semiconductor device can comprise providing a flexible substrate and forming a MEMS device over the substrate. Forming the MEMS device can comprise providing an electrically conductive layer over the substrate, providing a first dielectric over the electrically conductive layer, providing a sacrificial structure over the first dielectric, and providing a sensor membrane over the sacrificial structure. Other embodiments are described and claimed herein.

Figure 2:
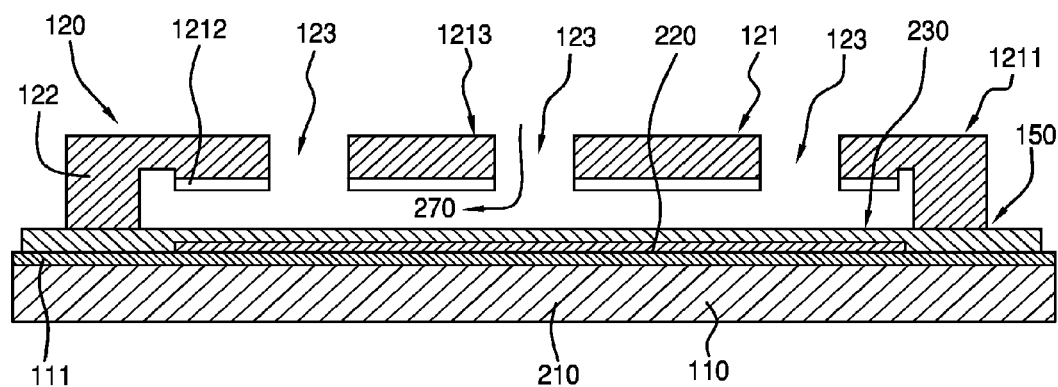
FIG. 2 illustrates a cross-sectional view along a line 1-1 of the semiconductor device of FIG. 1.

Turning to the drawings, FIG. 1 illustrates a perspective view of a semiconductor device comprising MEMS device 120 in accordance with an embodiment of the present disclosure. FIG. 2 illustrates a cross-sectional view along a line 1-1 of MEMS device 120 of FIG. 1. MEMS device 120 is merely exemplary and is not limited to the embodiments presented herein.

In the example of FIGS. 1-2, semiconductor device 100 comprises MEMS device 120 integrally fabricated over flexible semiconductor substrate 110. In the same and other examples, substrate 110 (or substrate body 210) can be a plastic substrate, and/or can comprise at least one of a flexible polyethylene naphthalate (PEN) material, such as that available from Teijin DuPont Films of Tokyo, Japan, under the tradename planarized "Teonex® Q65," a polyethylene terephthalate (PET) material, a polyethersulfone (PES) material, a polyimide, a polycarbonate, a cyclic olefin copolymer, and/or a liquid crystal polymer. In other examples, substrate 110 can comprise other materials such as a stainless steel material, a silicon material, an iron nickel (FeNi) alloy material (e.g., FeNi, FeNi36, or Invar™; where Invar™ comprises an alloy of iron (64 percent (%)) and nickel (36%) (by weight) with some carbon and chromium), an iron nickel cobalt (FeNiCo) alloy material (e.g., Kovar™, where Kovar™ typically comprises 29% nickel, 17% cobalt, 0.2% silicon, 0.3% manganese, and 53.5% iron (by weight)), a titanium material, a tantalum material, a molybdenum material, an aluchrome material, and/or an aluminum material.

As seen in FIG. 2, semiconductor substrate 110 comprises planarization layer 111 between substrate body 210 of substrate 110 and MEMS device 120 in the present example. In some examples, planarization layer 111 can comprise a dielectric passivation material over substrate body 210, such as silicon nitride.

As illustrated in FIGS. 1-2, MEMS device 120 can be fabricated directly on substrate 110, and can comprise electrically conductive material 220 located over substrate 110, dielectric 230 located over electrically conductive material 220, and sensor membrane 121 suspended over dielectric 230. Electrically conductive material 220 comprises a metallic layer in the present example, and can comprise a metallic material such as molybdenum, tantalum, aluminum, tungsten, and/or gold in at least some embodiments. There can be some embodiments where electrically conductive material 220 can be referred to as a plate. Dielectric 230 comprises a dielectric layer in the present example, and can comprise materials such as silicon nitride, silicon dioxide ($SiO_2$), and/or polyimide, in at least some embodiments.

In the present embodiment, membrane perimeter 1211 of sensor membrane 121 is supported by wall structure 122 over dielectric 230. Wall structure 122 comprises one or more dielectric layers deposited over dielectric 230 along sensor perimeter 150 of MEMS device 120 in the present example, and can comprise a silicon nitride material in at least some embodiments. As seen in FIG. 1, sensor perimeter 150 comprises a circular shape, and membrane perimeter 1211 of sensor membrane 121 is also correspondingly circular. In the same or a different embodiment, sensor perimeter 150 and/or membrane perimeter 1211 can comprise a radius of between approximately 50 micrometers to approximately 250 micrometers. In the example of FIGS. 1-2, sensor membrane 121 comprises a radius of approximately 70 micrometers. Another example can comprise a sensor membrane with a radius of approximately 200 micrometers. There can also be other embodiments where at least one of sensor perimeter 150 and/or membrane perimeter 1211 can comprise non-circular shapes, such as oval or square shapes. With a circular shape, however, MEMS device 120 can be more stable without needing a central support, as shown in FIG. 2. Wall structure 122 also defines sacrificial compartment 270 between sensor membrane 121 and dielectric 230. In the present example, sacrificial compartment 270 comprises an air gap.

As shown in FIGS. 1-2, sensor membrane 121 comprises one or more openings 123 leading to sacrificial compartment 270. In the present embodiment, MEMS device 120 comprises 7 openings 123 in sensor membrane 121, although other embodiments can comprise a different number of openings. For example, some implementations can comprise between approximately 5 to 20 openings leading to the sacrificial compartment. In the present example, one or more of openings 123 of sensor membrane 121 can measure approximately 12 micrometers by approximately 12 micrometers. In other examples where the sensor membrane comprises approximately between 10 to 150 openings, one or more of such openings can measure approximately 10-20 micrometers by approximately 10-20 micrometers. There can be further examples with openings comprising non-square perimeters, but otherwise can be similar to openings 123. In the present and other embodiments, openings 123 can be employed during the formation of sacrificial compartment 270. The formation of sacrificial compartment 270 will be further described below.

Sensor membrane 121 also comprises electrically conductive material 1212 facing dielectric 230 in the present example, where electrically conductive material 1212 can comprise a metallic material such as molybdenum, aluminum, tantalum, tungsten, and/or gold. In the same or other examples, a layer of doped amorphous silicon can also comprise part of electrically conductive material 1212 or be located adjacent thereto.

As seen in FIG. 2, electrically conductive material 1212 couples to support layer 1213 of sensor membrane 121, where support layer 1213 can be deposited above electrically conductive material 1212 during fabrication. In the present embodiment, perimeter 1211 of sensor membrane 121 comprises a perimeter of support layer 1213, and the perimeter of support layer 1213 anchors sensor membrane 121 to wall structure 122 past a perimeter of electrically conductive material 1212. In some examples, support layer 1213 can comprise a silicon nitride material, a silicon oxynitride ($SiO_xN_y$) material, a silicon dioxide ($SiO_2$) material, a passivation material, a siloxane-based material, an organosiloxane material, an organic siloxane-based material, and/or another dielectric material. In the same or other examples, support layer 1213 can comprise a PTS material such as that available from Honeywell International, Inc. of Morristown, N.J., under the name PTS-R.

In the same or a different example, support layer 1213 can comprise a thickness of between approximately 2 micrometers to approximately 2.5 micrometers. In the same or a different example, MEMS device 120 can comprise a height of between approximately 2.5 micrometers to approximately 3.5 micrometers over substrate 110.

In the present embodiment MEMS device 120 comprises a shock or pressure sensor, and is configured to sense variations in pressure by detecting changes in capacitance between sensor membrane 121 and electrically conductive material 220. In the same and other embodiments, electrically conductive material 220 and electrically conductive material 1212 of sensor membrane 121 can be considered as the plates of a capacitor, where the capacitance between the plates changes as sensor membrane 121 moves or deforms, at least temporarily, relative to electrically conductive material 220 as a result of the variations in pressure. In the same or other embodiments, when subject to shock waves and/or pressure changes, sensor membrane 121 can move or deform enough to move toward and/or make contact with dielectric 230 over electrically conductive material 220. In some embodiments, when in a steady state not subject to pressure variations, MEMS device 120 can comprise a capacitance of between approximately 1.5 picofarads and approximately 8.0 picofarads. In the same or different embodiments, MEMS device 120 can comprise a capacitance of between approximately 1.89 picofarads and approximately 7.8 picofarads. There can be embodiments where MEMS device 120 can sense pressure changes or shocks of between approximately 15 kilopascals (kPa) and 60 kPa. For example, where sensor membranes 121 comprises a radius of 70 micrometers, MEMs device 120 may be configured to sense pressure changes of approximately 50 kPa. In other examples with sensor membranes comprising a radius of 200 micrometers, pressure changes of approximately 20 kPa may be sensed.

Figure 3:
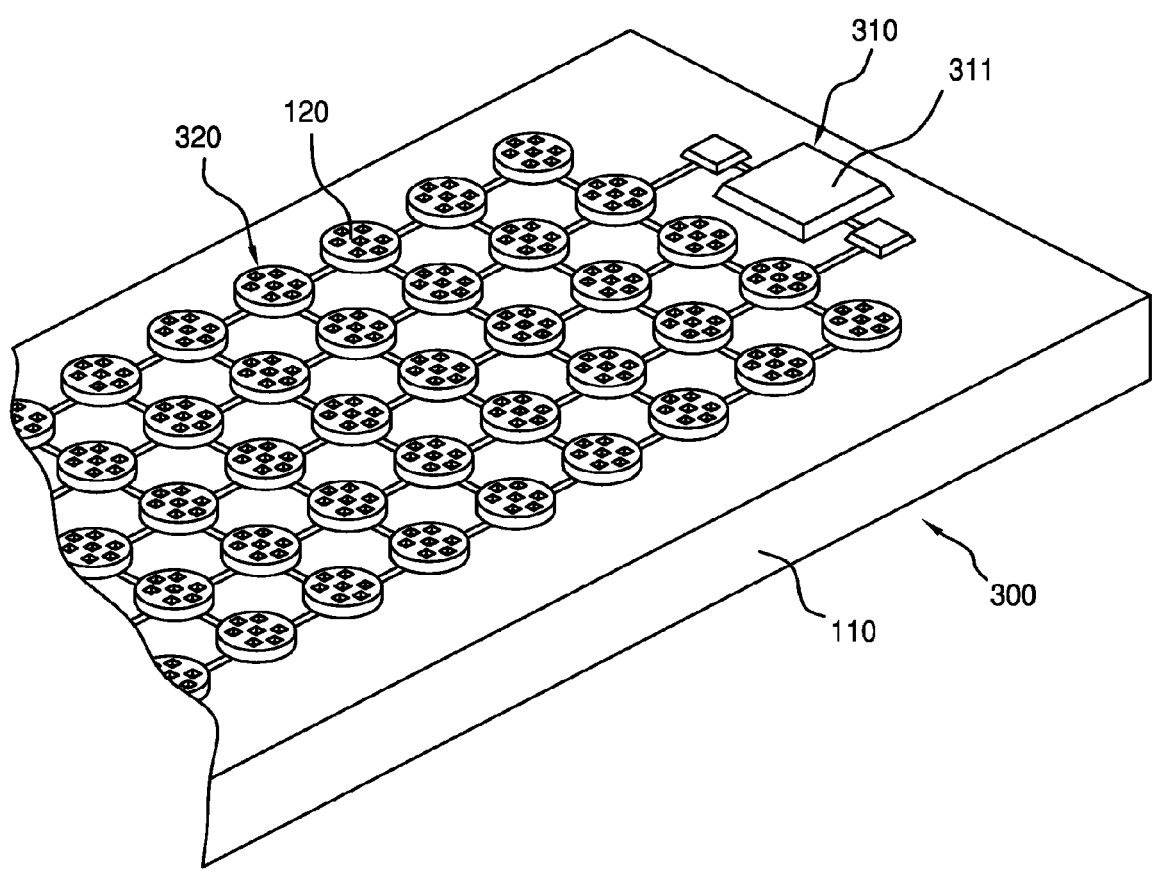
FIG. 3 illustrates a perspective view of a semiconductor device comprising a MEMS array having the MEMS device of FIGS. 1-2.

FIG. 3 illustrates a perspective view of semiconductor device 300 comprising MEMS array 320. In the embodiment of FIG. 3, MEMS array 320 comprises one or more MEMS sensors coupled together, including MEMS device 120 of FIGS. 1-2 as fabricated over substrate 110. Although the MEMS sensors of array 320 comprise the same diameter in the present examples, there can be examples where the MEMS array can comprise one or more MEMS sensors with a first diameter and one or more MEMS sensors with a different diameter and/or a different shape. In the present and other embodiments, semiconductor device 100 can comprise one or more electronic devices fabricated over substrate 110 different than MEMS device 120. For example, as shown in FIG. 3, one or more electronic devices 310, such as electronic device 311, can also be fabricated over substrate 110 and electrically coupled to MEMS device 120.

In the same or a different embodiment, MEMS device 120 and the other MEMS sensors of MEMS array 320 can be fabricated simultaneously over substrate 110 with electronic devices 310 using the same semiconductor process flow, or a modification of the semiconductor process flow, used for electronic devices 310, or vice versa. For example, electronic device 311 can comprise at least one transistor (not shown), and electrically conductive material 220 of MEMS device 120 (FIG. 2) can comprise a gate material used for a gate electrode of the at least one transistor of electronic device 311. In the same or a different example, dielectric 230 of MEMS device 120 (FIG. 2) can comprise a gate dielectric material used for a gate dielectric of the at least one transistor of electronic device 311.

Semiconductor device 300 can be implemented as a shock sensor and/or to detect pressure variations, and in the present and other examples, two or more of the MEMS sensors of MEMS array 320 can be coupled together in parallel to enhance the sensitivity of semiconductor device 300. The parallel coupling of the MEMS sensors of MEMS array 320 can increase the total capacitance of semiconductor device 300 and can help to minimize false readings by adding a level of redundancy to semiconductor device 300. In the same or other examples, such an arrangement can help to overcome false positives caused by random and/or faulty MEMs sensors.

In the present example, electronic device 311 represents a capacitance measurement circuit configured to measure and/or process the shock or pressure variations detected by MEMS array 310. In the same or a different example, semiconductor device 300 can comprise other electronic devices 310 such as display circuits (not shown) integrally fabricated over substrate 110. In such embodiments, the display circuits can comprise display elements such as pixels (picture elements) of a display, and can be electrically coupled to MEMS array 320 and/or to the capacitance measurement circuit of electronic device 311.

In the present and other implementations, semiconductor device 300 can integrate MEMS array 320 and other electronic devices 310 onto a single flexible substrate suitable for sensing and/or measuring shock or pressure variations, processing information out of the measurements, and displaying the information on the single flexible substrate. In the same or different embodiments, semiconductor device 300 can be configured to process blast dosimetry information measured at least partially via MEMS device 120 and/or to keep record of, for example, a number and/or magnitude of nearby explosions or shockwaves that a soldier has been exposed to during a period of time. In such examples, semiconductor device 300 can be attached to the soldier's gear and/or to the body of the soldier at predetermined locations, including locations expected to be exposed to peak shockwaves. As an example, semiconductor device 300 can be attached to a helmet and/or near the top back of the skull of the soldier. In the same or other examples, semiconductor device 300 can be attached with or as an adhesive bandage.

Figure 4:
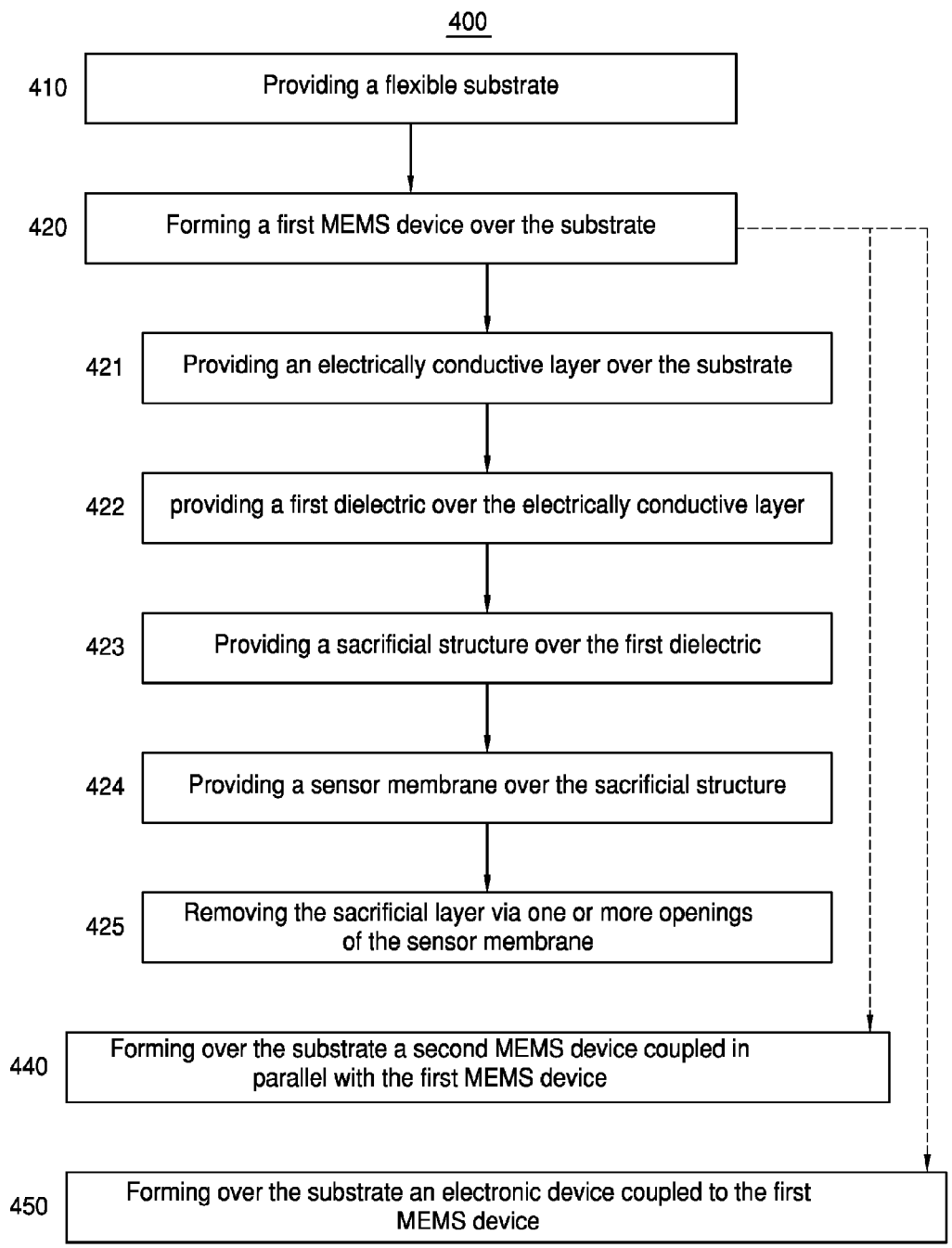
FIG. 4 illustrates a flowchart for a method for providing a semiconductor device.

Moving along, FIG. 4 illustrates a flowchart for a method 400 that can be used for providing a semiconductor device. In the same or different embodiments, method 400 can be considered a method of manufacturing a MEMS device, such as MEMS device 120 (FIGS. 1-3), over a flexible substrate. Method 400 is merely exemplary and is not limited to the embodiments presented herein. Method 400 can be employed in many different embodiments or examples not specifically depicted or described herein.

Figure 5:
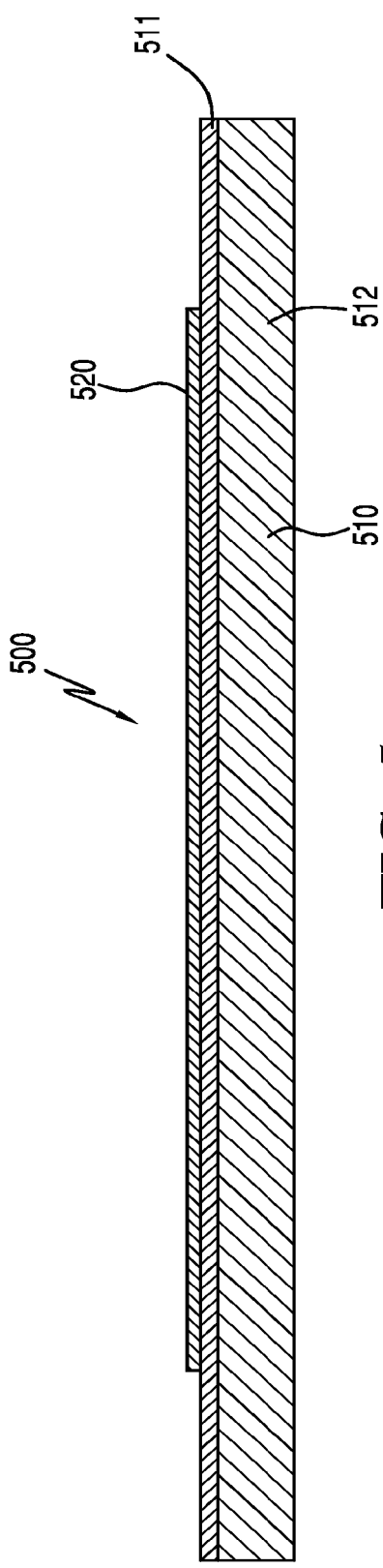
FIG. 5 illustrates a cross-sectional view of a portion of a MEMS device comprising a flexible substrate and a first plate in accordance with the method of FIG. 4.

Method 400 includes a procedure 410 of providing a substrate. FIG. 5 illustrates a cross-sectional view of a portion of MEMS device 500 comprising substrate 510, where substrate 510 can be similar to the substrate of procedure 410 and/or to substrate 110 (FIGS. 1-2) in some embodiments. In the same or different embodiments, procedure 410 of method 400 can include providing a flexible substrate. In many examples, the flexible substrate can be a plastic substrate. For example, in the embodiment of FIG. 5, body 512 of substrate 510 can be similar to substrate body 210 in FIG. 2, and can comprise a flexible polyethylene naphthalate (PEN) material, such as that available from Teijin DuPont Films of Tokyo, Japan, sold under the tradename planarized "Teonex® Q65." In other embodiments, the substrate of procedure 410 can comprise a flexible substrate comprising polyethylene terephthalate (PET), polyethersulfone (PES), polyimide, polycarbonate, cyclic olefin copolymer, and/or liquid crystal polymer. The thickness of the substrate of method 400 can be in the range of approximately 25 micrometers to approximately 300 micrometers in some embodiments. In the same or different embodiments, the thickness of the substrate can be in the range of approximately 100 micrometers to approximately 200 micrometers.

In some examples, procedure 410 can further comprise providing a planarized surface over the substrate. In the example of FIG. 5, the planarized surface of procedure 410 can be formed by planarization layer 511, where layer 511 can comprise a passivation layer at the top of substrate 510. In some embodiments, planarization layer 511 can comprise a dielectric material such as silicon nitride, and can have a thickness of approximately 3000 Angstroms. Layer 511 can be similar to planarization layer 111 in FIG. 2.

In a different example, procedure 410 can include providing a stainless steel flexible substrate. In still further examples, the substrate of procedure 410 can include silicon, iron nickel (FeNi) alloys (e.g., FeNi, FeNi36, or Inver™; where Inver™ comprises an alloy of iron (64%) and nickel (36%) (by weight) with some carbon and chromium), iron nickel cobalt (FeNiCo) alloys (e.g., Kovar™, where Kovar™ typically comprises 29% nickel, 17% cobalt, 0.2% silicon, 0.3% manganese, and 53.5% iron (by weight)), titanium, tantalum, molybdenum, aluchrome, and/or aluminum.

In the same or different embodiments, the substrate of procedure 410 can be coupled to a carrier (not shown) to provide rigidity and/or to support the substrate. In various embodiments, the carrier includes at least one of the following: alumina ($Al_2O_3$), silicon, glass, steel, sapphire, barium borosilicate, soda lime silicate, alkalai silicates, or other materials. The carrier can be coupled to the substrate using an adhesive or by other means. For example, the carrier could comprise sapphire with a thickness between approximately 0.7 millimeters (mm) and approximately 1.1 mm. The carrier could also comprise 96% alumina with a thickness between approximately 0.7 mm and approximately 1.1 mm. In a different embodiment, the thickness of the 96% alumina can be approximately 2.0 mm. In another example, the carrier could comprise single crystal silicon with a thickness of at least approximately 0.65 mm. In some examples, the carrier is slightly larger than the substrate.

The substrate of procedure 410 can be cleaned in some examples to remove any particles on the substrate. In some embodiments, the substrate can be cleaned to remove any adhesives on the substrate. For example, if the substrate is stainless steel, the substrate can be washed with hexanes for approximately twenty seconds while spinning at approximately 1,000 rpm (revolutions per minute). In some examples, the edge of the substrate can be sprayed with hexanes for the last ten seconds. Afterwards, the substrate can be spun at approximately 3,000 rpm for approximately twenty seconds to dry the substrate. In some examples, the substrate can be baked for approximately sixty seconds at approximately 105 degrees Celsius (° C.) to further dry the substrate.

To remove large particles from the substrate, the substrate of procedure 410 can be scrubbed. For example, if the substrate is stainless steel, the substrate can be scrubbed with soap and water (e.g., 40 milliliters (mL) of Alconox Detergent 8 mixed with one liter of water) using a sponge. Alconox Detergent 8 is manufactured by Alconox, Inc. of White Plains, N.Y. Organics can also be removed from the substrate by ashing in some examples. For example, if the substrate is stainless steel, the substrate can be ashed for approximately ninety minutes in an oxygen ($O_2$) environment at a pressure of approximately 1,200 milliTorr.

Continuing with method 400, procedure 420 comprises forming a first MEMS device over the substrate of procedure 410. In some embodiments, the first MEMS device of procedure 420 can be similar to MEMS device 120 from FIGS. 1-3). In the same or different embodiments, procedure 420 can comprise several subparts such as such as procedures 421-425.

In the present example of FIG. 4, procedure 421 comprises providing an electrically conductive layer over the substrate of procedure 410. In some embodiments, the electrically conductive layer can be referred to as a gate layer or as a first plate. In the same or other embodiments, the electrically conductive layer of procedure 421 can be similar to plate 520 of MEMS device 500 in FIG. 5. In turn, plate 520 can be similar to electrically conductive material 220 of semiconductor device 100 (FIG. 2). In the same or a different embodiments, plate 520 can be deposited over substrate 510 and then patterned to a desired form.

Figure 6:
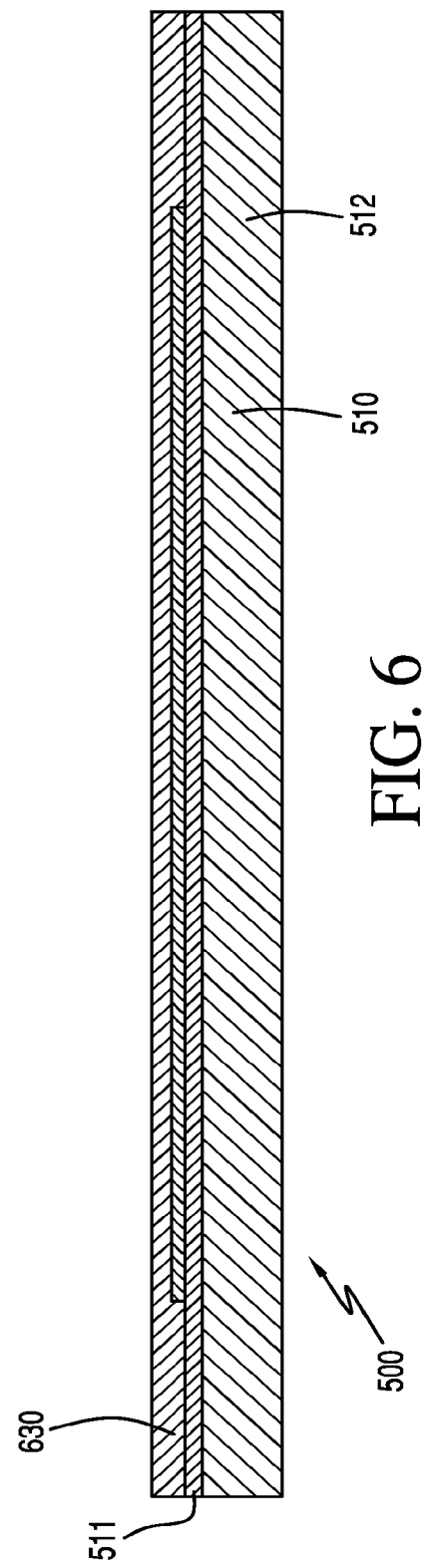
FIG. 6 illustrates a cross-sectional view of a portion of the MEMS device of FIG. 5 further comprising a first dielectric.

Procedure 422 of method 400 comprises providing a first dielectric over the electrically conductive layer of procedure 421. FIG. 6 illustrates a cross-sectional view of a portion of MEMS device 500 comprising dielectric 630, where dielectric 630 can be similar to the first dielectric of procedure 420 and/or to dielectric 230 (FIG. 2) in some embodiments. Dielectric 630 is deposited over planarization layer 511 of substrate 510 in the present example to a thickness of approximately 3000 Angstroms.

Procedure 423 of method 400 comprises providing a sacrificial structure over the first dielectric of procedure 422. In some examples, the sacrificial structure can be used to form sacrificial compartment 270 (FIG. 2) described for MEMS device 120 above. In the same or a different example, the sacrificial structure can be similar to sacrificial structure 770 as described in FIGS. 7-8. FIG. 7 illustrates a cross-sectional view of a portion of MEMS device 500 after a first part of the formation of sacrificial structure 770. FIG. 8 illustrates a cross-sectional view of a portion of MEMS device 500 after a second part of the formation of sacrificial structure 770.

In the present example of method 400, part of procedure 423 comprises providing a sacrificial layer over the first dielectric of procedure 422. In the example of FIG. 7, sacrificial layer 771 deposited over dielectric 630 can be similar to the sacrificial layer of procedure 423 of method 400. In some examples, sacrificial layer 771 can comprise an amorphous silicon channel material. In the same or other examples, the sacrificial layer can be deposited over dielectric 630 to a thickness of approximately 0.08 micrometers. In the present example, sacrificial structure 770 also comprises dielectric layer 772 deposited over sacrificial layer 771, where dielectric layer 772 can comprise a patterned silicon nitride intermetal dielectric (IMD) layer having a thickness of approximately 0.10 micrometers in some examples. In other embodiments, sacrificial structure 700 can comprise a single layer.

In the present example, part of procedure 423 of method 400 can also comprise providing a compartment wall at a perimeter of the sacrificial layer and over the first dielectric, where the compartment wall for procedure 423 can be similar to wall structure 122 of semiconductor device 100 (FIGS. 1-2). In the same or different examples, now referring to FIG. 8, compartment wall 822 can correspond to the compartment wall for procedure 423 as formed by dielectric layer 873. In the present example, dielectric layer 873 comprises a patterned approximately 0.10 micrometer thick silicon nitride layer. In the same or other examples, dielectric layer 873 can comprise a passivation material. There can also be other examples where dielectric layer 873 can comprise other dielectric materials and/or IMD layer.

As seen in FIG. 8, compartment wall 822 can be formed by providing one or more dielectric layers, such as dielectric layers 772 and 873, over sacrificial layer 771. In other examples, dielectric layer 772 can be omitted from compartment wall 822 such that compartment wall 822 would only comprise a single dielectric layer comprising the space occupied by dielectric layers 772 and 873 in FIG. 8. A perimeter of dielectric layer 873 contacts dielectric 630 in the present example past a perimeter of sacrificial layer 771 and dielectric layer 772. As a result, compartment wall 822 bounds the perimeter of sacrificial layer 771 and dielectric layer 772 in the present example.

Once placed over sacrificial layer 771, the one or more dielectric layers described above can be patterned to remove portions thereof over sacrificial layer 771 and thereby further define compartment wall 822. For example, FIG. 8 presents dielectric layers 873 and 772 after being etched to expose at least part of sacrificial layer 771.

Figure 11:
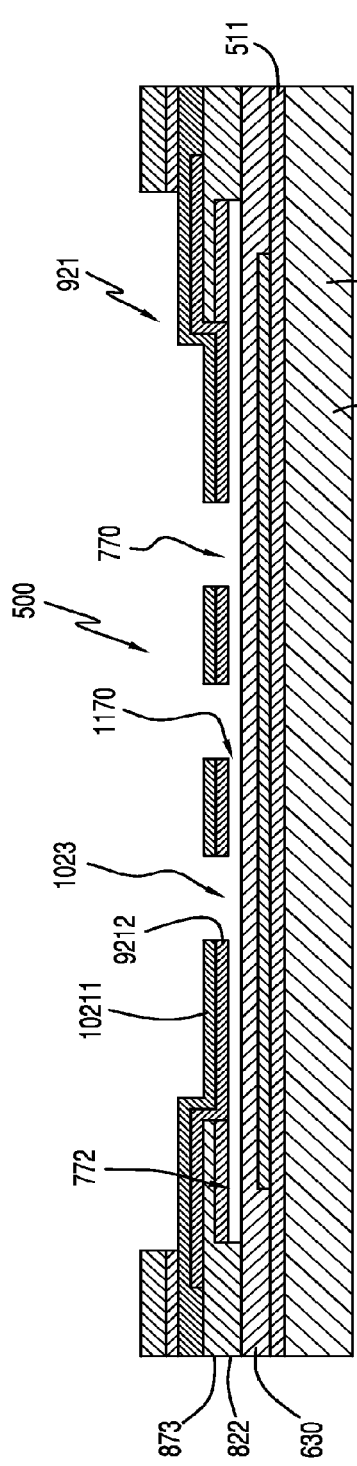
FIG. 11 illustrates a cross-sectional view of a portion of the MEMS device of FIG. 10 after removal of the sacrificial layer.

Continuing with method 400, procedure 424 comprises providing a sensor membrane over the sacrificial structure of procedure 423. In some examples, the sensor membrane of procedure 424 can be similar to sensor membrane 121 of MEMS device 120 (FIGS. 1-2). In the same or different examples, the sensor membrane of procedure 424 and/or sensor membrane 121 can be similar to sensor membrane 921 as illustrated in FIGS. 9-11, and/or can comprise a substantially circular perimeter.

In the present example, part of procedure 424 comprises providing a second electrically conductive layer over the sacrificial structure of procedure 423. FIG. 9 illustrates a cross-sectional view of a portion of MEMS device 500 after a first part of the formation of sensor membrane 921. In the embodiment of FIG. 9, the second electrically conductive layer described for procedure 424 can be similar to plate 9212 of sensor membrane 921 over sacrificial structure 770. In the same or a different embodiment, the second electrically conductive layer of procedure 424 and/or plate 9212 can be similar to electrically conductive material 1212 described above for MEMS device 120 (FIG. 2). In some examples, plate 9212 can have a thickness of approximately 0.20 micrometers. In the same or different examples, plate 9212 can comprise at least one of an aluminum material, a molybdenum material, a tungsten material, a gold material and/or a tantalum material. There may be embodiments where plate 9212 can comprise a stack of more than one material.

As seen in FIG. 9, one or more openings 923 can be etched through plate 9212 to expose one or more portions of sacrificial structure 770 and/or of sacrificial layer 771 in at least some embodiments. Openings 923 can be similar, for example, to openings 123 through membrane 121 of MEMS device 120 as described above for FIGS. 1-2. In the same or different examples, plate 9212 can be etched in one in-situ etching procedure with dielectric layer 873 and/or sacrificial layer 771 acting as etch stop layers. In some examples, plate 9212 can be etched using an AMAT 8330, manufactured by Applied Material, Inc. of Santa Clara, Calif. A perimeter of plate 9212 can extend beyond a perimeter of plate 520, as illustrated in FIG. 9.

Another part of procedure 424 of method 400 can comprise providing a structural layer over the second electrically conductive layer. As an example, FIG. 10 illustrates a cross-sectional view of a portion of MEMS device 500 after a second part of the formation of sensor membrane 921. In the embodiment of FIG. 10, the structural layer described for procedure 424 can be similar to structural layer 10211 of sensor membrane 921 over plate 9212. In the same or a different embodiment, the structural layer of procedure 424 and/or structural layer 10211 can be similar to support layer 1213 described above for MEMS device 120 (FIG. 2), and can comprise similar materials. There may be embodiments where structural layer 10211 can comprise a stack of more than one material. In the present example of FIG. 10, a perimeter of structural layer 10211 is shown coupled with a perimeter of sacrificial structure 770 past a perimeter of plate 9212. As a result, the perimeter of structural layer 10211 contacts with dielectric layer 873 at the perimeter of compartment wall 822 and bounds the perimeter of plate 9212 in the present example. As seen in FIG. 10, one or more openings 1023 can be etched through structural layer 10211 to expose one or more portions of sacrificial structure 770 and/or of sacrificial layer 771 in at least some embodiments. Openings 1023 can be similar to, and substantially aligned with, openings 923 as etched through plate 9212, and can also be similar to openings 123 through membrane 121 of MEMS device 120 as described above for FIGS. 1-2. In some examples, openings 1023 can be plasma etched. In the same of different embodiments, openings 1023 can be etched with a fluorine-based etchant. In some examples, the etchant can be trifluoromethane ($CHF_3$), sulfur hexafluoride ($SF_6$), or other fluorine-based etchants. In some embodiments, openings 1023 can be formed before openings 923, and after forming openings 1023, the remainder of structural layer 10211 can be used as a self-aligned etch mask for openings 923.

There can be examples, including those where the substrate of procedure 410 comprises a plastic substrate, where the different procedures of method 400 to form the first MEMS device are carried out at temperatures not exceeding approximately 190 degrees Celsius. In such examples, the low temperature at which the MEMS device of procedure 420 is fabricated can assist in preventing heat-related damage to the susbstrate of procedure 410 and/or to elements of the MEMS device of procedure 420.

Continuing with method 400, procedure 425 comprises removing the sacrificial layer described above for procedure 423 via one or more openings of the sensor membrane of procedure 424. In some examples, a sacrificial compartment similar to sacrificial compartment 270 of MEMS device 120 (FIG. 2) remains between the sensor membrane of procedure 424 and the first dielectric of procedure 422 after the sacrificial layer is removed in procedure 425. FIG. 11 illustrates a cross-sectional view of a portion of MEMS device 500 after removal of sacrificial layer 771 from sacrificial compartment 1170 between sensor membrane 921 and dielectric 630 in accordance with an implementation of procedure 425 of method 400. In the example of FIG. 11, sacrificial layer 771 has been removed via etching through openings 1023 of sensor membrane 921 to release sensor membrane 921. In some examples, the etching through openings 1023 can be performed using a dry etch process. In the same or a different example, the etching through openings 1023 can comprise the use of a xenon difluoride ($XeF_2$) reactant or another gaseous reactant. The use of a dry etchant eliminates the problem of stiction when a wet etchant is used. In the same or a different example, the reactant used for etching sacrificial layer 771 comprises enough selectivity to etch only at sacrificial layer 771 without etching or at least without substantially etching sacrificial structure 770 or any other element bounding sacrificial compartment 1170, including plate 9212, dielectric 630, compartment wall 822, dielectric layer 873, structural layer 10211, or dielectric layer 772. In the same or a different example, no separate masking is needed prior to carrying out the etch of sacrificial layer 771.

In some examples, method 400 can comprise procedure 440, comprising forming over the substrate a second MEMS device electrically coupled in parallel with the first MEMS device of procedure 420. In some examples, the second MEMS device can be similar to the first MEMS device and/or can be manufactured using the same semiconductor process flow. In the same or a different example, the first and second MEMS devices of method 400 can be coupled together as described above with respect to FIG. 3 for the MEMS sensors of MEMS array 320. In the same or a different example, the second MEMS device of procedure 440 can comprise a sensor membrane with a diameter and/or a perimeter different than a diameter and/or a perimeter of the sensor membrane provided in procedure 424 for the first MEMS device of procedure 420.

There can be some examples where method 400 also can comprise procedure 450, comprising forming over the substrate an electronic device electrically coupled to the MEMS device of procedure 420. In the same or a different example, the electronic device can be similar to one of electronic devices 310 described above for FIG. 3, and/or could comprise at least part of a display element and/or a capacitance measurement circuit.

Figure 12:
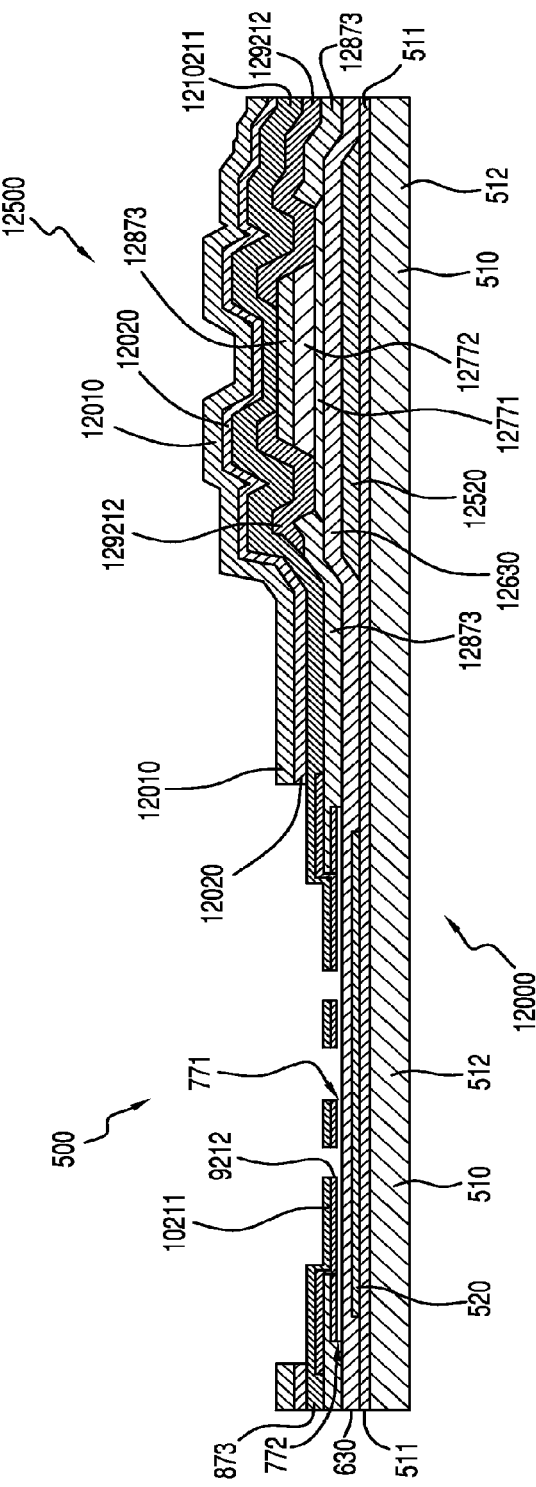
FIG. 12 illustrates a cross-sectional view of a semiconductor device comprising both the MEMS device of FIG. 11 and an electronic device 12500 fabricated over the same flexible substrate.

In some embodiments, method 400 can be implemented such that the MEMS device of procedure 420 is fabricated pursuant to a semiconductor process flow for the electronic device of procedure 450 over the flexible substrate of procedure 410, or a modification of such semiconductor process flow. As an example, FIG. 12 illustrates a cross-sectional view of semiconductor device 12000 comprising both MEMS device 500 and electronic device 12500 fabricated over flexible substrate 510. In some examples, electronic device 12500 can correspond to at least part of the electronic device of procedure 450. In the same or a different examples, the part of the electronic device comprises a transistor, and in particular, a thin film transistor.

As can be seen in FIG. 12, MEMS device 500 shares substrate 510, including body 512 and planarization layer 511, with electronic device 12500. Other elements of MEMS device 500 can be fabricated with layers used to fabricate corresponding elements of electronic device 12500. For example, plate 520 of MEMS device 500 can be fabricated out of the same layer or electrically conductive material used to fabricate gate electrode 12520 of electronic device 12500. As a result, the electrical conductive material of plate 520 and the gate electrode of electronic device 12500 can be provided simultaneously during the fabrication of semiconductor device 12000.

In similar fashion, dielectric 630 of MEMS device 500 can be fabricated out of the same layer of material used to fabricate gate dielectric 12630 of electronic device 12500. As a result, dielectric 630 and gate dielectric 12630 can be provided simultaneously during fabrication of semiconductor device 12000.

Plate 9212 of sensor membrane 921 if MEMS device 500 can be fabricated out of the same layer or layers of electrically conductive material as source/drain conductive layer 129212 of electronic device 12500. As a result, plate 9212 and source/drain conductive layer 129212 can be provided simultaneously during fabrication of semiconductor device 12000.

Structural layer 10211 of sensor membrane 921 of MEMS device 500 can be fabricated out of the same layer or layers of material used to fabricate planarization layer 1210211 of electronic device 12500. As a result, structural layer 10211 and planarization layer 1210211 can be provided simultaneously during fabrication of semiconductor device 12000.

Other elements of MEMS device 500 can be similarly fabricated based on layers used to fabricate elements of electronic device 12500. For example, although sacrificial layer 771 is already removed from MEMS device 500 in FIG. 12, in accordance with procedure 425 of method 400, sacrificial layer 771 of MEMS device 500 can be fabricated out of the same layer of channel material used to fabricate channel 12771 of electronic device 12500. Similarly, dielectric layer 772 of MEMS device 500 can be fabricated out of the same layer of material used to fabricate IMD layer 12772 of electronic device 12500. Dielectric layer 873 of MEMS device 500 can be fabricated out of the same layer of material used to fabricate passivation layer 12873 of electronic device 12500.

In the example of FIG. 12, layer 12020 is located over planarization layer 1210211 of electronic device 12500, and layer 12010 is located over layer 12020 of electronic device 12500. In some examples, layer 12020 can comprise an indium-tin-oxide material, and/or layer 12010 can comprise silicon nitride or other dielectric material configured to create an overglass protection layer. Although layers 12010 and 12020 are not needed in the present example for MEMS device 500, MEMS device 500 is still compatible with the semiconductor process for electronic device 12500. For example, layers 12010 and 12020 can be formed and patterned over structural layer 10211 before the removal of sacrificial layer 771.

In some examples, one or more of the different procedures of method 400 can be combined into a single step or performed simultaneously, and/or the sequence of such procedures can be changed. For example, procedure 450 could be performed before procedure 440 in some examples. In other examples, the first MEMS device of procedure 420, the second MEMS device of procedure 440, and the electronic device of procedure 450 can be fabricated simultaneously and/or combined into a single step. There can also be examples where method 400 can comprise further or different procedures. As an example, a procedure could be added after procedure 450 to form a second electronic device over the substrate of procedure 410. In such an example, the electronic device of procedure 450 could form part of a capacitance measurement circuit, and the electronic device of procedure 460 could form part of a display circuit for the semiconductor device of method 400. Other variations can be implemented for method 400 without departing from the scope of the present disclosure.

Although the embedded MEMS sensors and related methods herein have been described with reference to specific embodiments, various changes may be made without departing from the spirit or scope of the present disclosure. For example, even though openings 123 of MEMS device 120 have been presented as square-shaped, there can be embodiments with similar openings comprising other geometrical perimeters. Additional examples of such changes have been given in the foregoing description. Accordingly, the disclosure of embodiments herein is intended to be illustrative of the scope of the invention and is not intended to be limiting. It is intended that the scope of this application shall be limited only to the extent required by the appended claims. The embedded MEMS sensors and related methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that any of the procedures, processes, and/or activities of method 400 (FIG. 4) may be comprised of many different procedures, processes, and activities and be performed by many different modules, in many different orders, that any element of FIGS. 1-12 may be modified, and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A semiconductor device comprising:
a flexible substrate; and
a MEMS device fabricated over the flexible surface;
wherein:
  the MEMS device comprises:
    an electrically conductive material located over the flexible substrate;
    a sensor membrane movably suspended over the electrically conductive material;
    a first dielectric located over the electrically conductive material and under the sensor membrane; and
    a wall structure coupled to the first dielectric; and
  the sensor membrane is suspended by the wall structure over the electrically conductive material.

2. The semiconductor device of claim 1 further comprising at least one of:
a planarization layer between the flexible substrate and the MEMS device;
an electronic device fabricated over the flexible substrate and electrically coupled to the MEMS device; or
two or more MEMS sensors electrically coupled in parallel with each other, wherein one of the two or more MEMS sensors comprises the MEMS device.

3. The semiconductor device of claim 2 wherein:
when the semiconductor device comprises the electronic device, at least one of:
  the electronic device comprises at least one of a display element or a capacitance measurement circuit; or
  the electronic device is configured to process blast dosimetry information measured via the MEMS device.

4. The semiconductor device of claim 1 wherein:
the flexible substrate comprises at least one of:
  a PEN material, a PET material, a PES material, a polyimide, a polycarbonate, a cyclic olefin copolymer, a liquid crystal polymer, a stainless steel material, a FeNi alloy material, a FeNiCo alloy material, a titanium material, a tantalum material, a molybdenum material, an aluchrome material, or an aluminum material.

5. The semiconductor device of claim 1 wherein at least one of:
the electrically conductive material comprises at least one of molybdenum, tantalum, aluminum, tungsten, or gold;
the sensor membrane is configured to move toward the first dielectric when deformed by at least one of a shock wave or a pressure change; or
the sensor membrane is substantially circular.

6. The semiconductor device of claim 1 wherein:
the MEMS device further comprises a compartment between the electrically conductive material and the sensor membrane.

7. The semiconductor device of claim 6 wherein at least one of:
the sensor membrane comprises between approximately 5 openings to approximately 20 openings into the compartment; or
the compartment defines an air gap between the electrically conductive material and the sensor membrane.

8. The semiconductor device of claim 7 wherein:
the sensor membrane comprises:
  a second electrically conductive material facing the first dielectric; and a support layer located over the second electrically conductive material and anchored at a perimeter of the sensor membrane.

9. The semiconductor device of claim 8 wherein at least one of:
the second electrically conductive material comprises at least one of aluminum, tantalum, molybdenum, tungsten, or gold;
the support layer comprises at least one of a silicon nitride material, a silicon oxynitride material, a silicon dioxide material, a passivation material, a siloxane-based material, an organosiloxane material, an organic siloxane-based material, or a PTS material; or
the support layer comprises a thickness of between approximately 2 micrometers to approximately 2.5 micrometers.

10. The semiconductor device of claim 1 wherein:
the wall structure comprises one or more dielectric layers located over the first dielectric along a sensor perimeter of the MEMS device.

11. The semiconductor device of claim 1 further comprising at least one of:
a first electronic device fabricated over the flexible substrate and electrically coupled to the MEMS device, wherein the first electronic device comprises at least one first transistor and the electrically conductive material comprises a gate electrode material used for a gate electrode of the at least one first transistor of the first electronic device; or
a second electronic device fabricated over the flexible substrate and electrically coupled to the MEMS device, wherein the second electronic device comprises at least one second transistor and the first dielectric comprises a gate dielectric material used for a gate dielectric of the at least one second transistor of the second electronic device.

12. A semiconductor device comprising:
a flexible substrate; and
a MEMS device fabricated over the flexible surface;
wherein at least one of:
the MEMS device comprises a circular perimeter with a radius of between approximately 50 micrometers to approximately 250 micrometers;
the MEMS device comprises a height of between approximately 2.5 micrometers to approximately 3.5 micrometers; or
the MEMS device comprises a steady state capacitance of between approximately 1.5 picofarads to approximately 8.0 picofarads.

13. A method comprising:
providing a flexible substrate; and
fabricating a first MEMS device over the flexible substrate;
wherein:
fabricating the first MEMS device comprises:
providing an electrically conductive material layer located over the flexible substrate;
providing a sensor membrane configured to be movably suspended over the electrically conductive material layer;
providing a first dielectric located over the electrically conductive material layer and under the sensor membrane; and
providing a wall structure coupled to the first dielectric;
and
the sensor membrane is configured to be suspended by the wall structure over the electrically conductive material layer.

14. The method of claim 13, wherein:
fabricating the first MEMS device comprises:
providing a sacrificial structure over the electrically conductive material layer; and
providing the sensor membrane over the sacrificial structure.

15. The method of claim 14 wherein at least one of:
providing the flexible substrate comprises providing the flexible substrate to comprise at least one of a PEN material, a PET material, a PES material, a polyimide, a polycarbonate, a cyclic olefin copolymer, or a liquid crystal polymer;
the sacrificial structure comprises an amorphous silicon material;
providing the sensor membrane comprises providing the sensor membrane to comprise a substantially circular perimeter;
fabricating the first MEMS device comprises forming the first MEMS device at temperatures not exceeding approximately 190 degrees Celsius; or
fabricating the first MEMS device further comprises providing the first dielectric between the electrically conductive material layer and the sacrificial structure.

16. The method of claim 14 wherein:
providing the sacrificial structure comprises:
providing a sacrificial layer over the electrically conductive material layer.

17. The method of claim 16 wherein:
providing the sacrificial structure comprises providing a compartment wall of the wall structure at a perimeter of the sacrificial layer and over the electrically conductive material layer, the compartment wall comprising one or more dielectric layers;
providing the compartment wall comprises providing a perimeter of at least one of the one or more dielectric layers of the compartment wall to couple with the first MEMS device past a perimeter of the sacrificial layer; and
the one or more dielectric layers over the sacrificial layer comprise at least one of an intermetal dielectric material, a passivation material, or a silicon nitride material.

18. The method of claim 16 further comprising:
etching one or more openings through the sensor membrane to expose one or more portions of the sacrificial layer; and
removing the sacrificial layer via the one or more openings of the sensor membrane.

19. The method of claim 18 wherein:
removing the sacrificial layer comprises dry etching the sacrificial layer through the one or more openings of the sensor membrane; and
dry etching the sacrificial layer comprises using at least one of a dry etch reactant, a gaseous reactant, or an $XeF_2$ reactant.

20. The method of claim 14 wherein:
providing the sensor membrane comprises:
providing a second electrically conductive material layer over the sacrificial structure; and
providing a structural layer over the second electrically conductive material layer.

21. The method of claim 20 wherein at least one of:
providing the structural layer comprises providing a perimeter of the structural layer to couple with a perimeter of the sacrificial structure past a perimeter of the second electrically conductive material layer;
providing the sensor membrane further comprises etching one or more openings through the second electrically conductive material layer to expose one or more portions of the sacrificial structure prior to providing the structural layer;

the second electrically conductive material layer comprises at least one of an aluminum material, a tantalum material, a molybdenum material, a tungsten material, or a gold material;

the structural layer comprises at least one of a silicon nitride material, a silicon oxynitride material, a silicon dioxide material, a passivation material, a siloxane-based material, an organosiloxane material, an organic siloxane-based material, or a PTS material; or providing the sensor membrane further comprises etching one or more openings through the structural layer to expose at least a portion of the sacrificial structure.

22. The method of claim 14 further comprising:

forming over the flexible substrate an electronic device electrically coupled to the first MEMS device;

wherein the electronic device comprises at least one of:
    a display element; or
    a capacitance measurement circuit.

23. The method of claim 22 wherein at least one of:

the first MEMS device is fabricated pursuant to at least one of: (1) a semiconductor process flow for the electronic device or (2) a modification of the semiconductor process flow for the electronic device;

providing the electrically conductive material layer comprises simultaneously providing the electrically conductive material layer and a gate electrode for a transistor of the electronic device;

providing the sensor membrane comprises providing at least a portion of the sensor membrane simultaneously with a channel material of a transistor of the electronic device; or forming the electronic device comprises providing a gate dielectric of a transistor of the electronic device simultaneously with a dielectric of the first MEMS device.

* * * * *